(12) United States Patent
Pusateri

(10) Patent No.: US 9,038,504 B2
(45) Date of Patent: May 26, 2015

(54) AUTO-SHIFT REVERSING MECHANISM

(71) Applicant: Snap-on Incorporated, Kenosha, WI (US)

(72) Inventor: Daniel Pusateri, Grayslake, IL (US)

(73) Assignee: Snap-on Incorporated, Kenosha, WI (US)

( * ) Notice: Subject to any disclaimer, the term of this patent is extended or adjusted under 35 U.S.C. 154(b) by 223 days.

(21) Appl. No.: 13/653,719

(22) Filed: Oct. 17, 2012

(65) Prior Publication Data

US 2014/0102260 A1   Apr. 17, 2014

(51) Int. Cl.
*B25B 21/00* (2006.01)
*B25B 13/46* (2006.01)
*F16H 19/04* (2006.01)
*F16H 31/00* (2006.01)

(52) U.S. Cl.
CPC ............ *B25B 13/463* (2013.01); *B25B 21/004* (2013.01); *F16H 19/04* (2013.01); *F16H 31/00* (2013.01)

(58) Field of Classification Search
USPC .......... 81/57.13, 57.14, 57.29, 57.3, 62–63.2; 74/31
See application file for complete search history.

(56) References Cited

U.S. PATENT DOCUMENTS

| | | | |
|---|---|---|---|
| 912,777 A * | 2/1909 | Baldwin | ............................ 81/62 |
| 2,130,111 A | 9/1938 | Whitney et al. | |
| 2,764,705 A | 9/1956 | Albertson et al. | |
| 2,979,089 A | 4/1961 | Piesker | |
| 3,329,185 A | 7/1967 | Hettich et al. | |
| 3,783,716 A | 1/1974 | Saito | |
| 3,791,242 A | 2/1974 | Bartush | |
| 3,802,518 A | 4/1974 | Albert | |
| 3,905,429 A | 9/1975 | Berger | |
| 3,939,924 A | 2/1976 | Grabovac | |
| 4,215,601 A | 8/1980 | Mann | |
| 4,289,049 A | 9/1981 | Rebish | |
| 4,409,865 A * | 10/1983 | Krautter et al. | .............. 81/57.39 |
| 4,462,281 A | 7/1984 | Zils | |
| 4,524,649 A | 6/1985 | Diaz et al. | |
| 4,589,307 A * | 5/1986 | Parker | ................................ 81/62 |
| 4,790,218 A | 12/1988 | Cabrera | |
| 4,810,916 A | 3/1989 | McBride | |

(Continued)

FOREIGN PATENT DOCUMENTS

CN   101987441 A   3/2011
CN   202180437 U   4/2012

(Continued)

OTHER PUBLICATIONS

Canadian Examination Report dated Jan. 15, 2014; 6 pages.

(Continued)

*Primary Examiner* — Hadi Shakeri
(74) *Attorney, Agent, or Firm* — Seyfarth Shaw LLP

(57) ABSTRACT

A device that automatically actuates the reversing lever of a ratchet mechanism when the radial direction of the motor is changed. The auto-shift mechanism includes a worm gear that rotates with the motor, and a disc coupled to the worm gear that moves laterally as the worm gear rotates. Axial movement of the disc actuates a reversing lever of a ratchet mechanism by either pulling or pushing the reversing lever. A lost-motion mechanism can absorb an initial amount of torque so that the auto-shift mechanism can run its course prior to applying the torque to a fastener.

16 Claims, 4 Drawing Sheets

(56) References Cited

U.S. PATENT DOCUMENTS

| | | |
|---|---|---|
| 4,905,423 A | 3/1990 | van Laere |
| 4,974,475 A | 12/1990 | Lord et al. |
| 5,207,129 A | 5/1993 | Fossella |
| 5,251,706 A | 10/1993 | Evans |
| 5,311,949 A | 5/1994 | Chapin |
| 5,448,931 A | 9/1995 | Fossella et al. |
| 5,562,015 A | 10/1996 | Zinck |
| 5,738,177 A | 4/1998 | Schell et al. |
| 6,095,658 A | 8/2000 | Kalousis |
| 6,199,642 B1 | 3/2001 | Becker et al. |
| 6,218,746 B1 | 4/2001 | Gouge, Jr. |
| 6,568,298 B1 | 5/2003 | Zinck |
| 6,739,221 B2 | 5/2004 | Cha |
| 6,789,447 B1 | 9/2004 | Zinck |
| 6,832,531 B1 | 12/2004 | Marquardt |
| 6,923,094 B1 | 8/2005 | Marquardt |

FOREIGN PATENT DOCUMENTS

| | | |
|---|---|---|
| TW | 410714 | 11/2000 |
| TW | I288689 | 10/2007 |

OTHER PUBLICATIONS

Office Action dated Jan. 20, 2015 received from the Chinese Patent Office; 5 pages.

English translation of the Chinese Patent Office Action, dated Jan. 20, 2015, 1 page.

Office Action dated Dec. 12, 2014 received from the Canadian Patent office; 3 pages.

\* cited by examiner

US 9,038,504 B2

AUTO-SHIFT REVERSING MECHANISM

TECHNICAL FIELD OF THE INVENTION

The present application relates generally to ratchet mechanisms. More particularly, the present application relates to a mechanism that automatically actuates a reversing lever of a ratchet when the direction of the ratchet driveshaft is changed.

BACKGROUND OF THE INVENTION

Ratchets are used to apply torque to a fastener, such as a threaded bolt. The ratchet can apply torque in, for example, a clockwise direction to drive the fastener into a work piece. In this example, a pawl mechanism engages a ratchet gear when rotated in the clockwise direction, but does not engage the ratchet gear when rotated in the counterclockwise direction. Accordingly, following the application of torque, a user can reposition the ratchet by rotating it in the counterclockwise direction without loosening the fastener. To reverse the drive direction, the user can actuate a reversing lever and loosen the fastener with the application of counterclockwise torque.

Powered ratchets have improved conventional hand ratchets by providing a powered means of supplying torque to a workpiece. For example, the user can push a trigger downward to apply torque in a first drive direction, or push the trigger upward to apply torque in a second drive direction. Similar to handheld ratchets, conventional powered ratchets still require the user to manually actuate a reversing lever to switch the drive direction of the pawl mechanism, and subsequent application of torque.

SUMMARY OF THE INVENTION

The present application discloses a structure that automatically actuates a reversing lever of a ratchet mechanism when the user reverses the drive direction of a motor adapted to apply torque to a work piece. The auto-shift mechanism includes a driveshaft having a worm gear that rotates with the motor driveshaft. A disc is provided on the worm gear and axially moves along the worm gear. The axial movement of the disc can actuate a reversing lever of a ratchet mechanism by either pulling or pushing the reversing lever. A lost-motion mechanism is also provided so that torque from the motor can initially be applied to the auto-shift mechanism, and not the fastener, when the motor changes direction.

In particular, the present application discloses a tool including a pawl mechanism adapted to engage a ratchet gear to substantially permit rotation of the ratchet gear in a first drive direction and to substantially impair rotation of the ratchet gear in an impaired direction, a reversing lever coupled to the pawl mechanism and adapted to control the drive direction of the ratchet gear, and an auto-shift mechanism including a first driveshaft extending in an axial direction and rotatable in a circumferential direction, a worm gear coupled to the first driveshaft and having gear threads, a disc having disc threads cooperatively engageable with the gear threads, and an arm coupled to the disc and the reversing lever, wherein the disc is axially movable along the first driveshaft to shift the reversing lever upon rotation of the worm gear.

The present application also discloses an auto-shift reversing mechanism adapted to control a drive direction of a ratchet and includes a first driveshaft extending in an axial direction and adapted to rotate in a circumferential direction, a worm gear coupled to the first driveshaft and having gear threads, a disc having disc threads cooperatively engageable with the gear threads and adapted to axially move along the first driveshaft upon rotation of the worm gear, and an arm coupled to the disc and the reversing lever.

Also disclosed is a method of applying torque to a ratchet head including receiving the torque at a first driveshaft extending in an axial direction and adapted to rotate in a circumferential direction, transmitting the torque to an auto-shift reversing mechanism, causing, with the auto-shift reversing mechanism, axial movement of an arm based on the torque transmitted to the auto-shift reversing mechanism, and actuating a reversing lever with the arm.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

Figure 1:
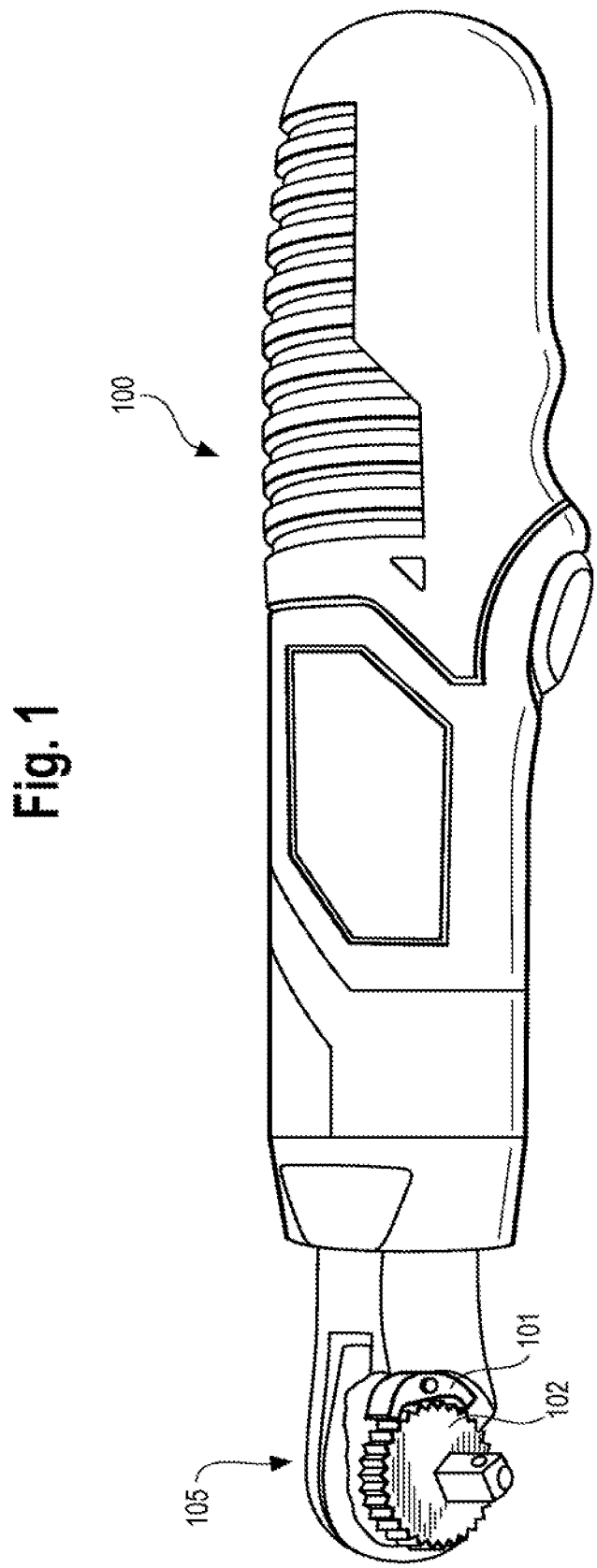
FIG. 1 is a side elevation view of a tool according to an embodiment of the present application.

It should be understood that the comments included in the following description, as well as the materials, dimensions and tolerances discussed therein, are simply proposals such that one skilled in the art would be able to modify the proposals within the scope of the present application.

DETAILED DESCRIPTION OF THE EMBODIMENTS

While the present invention is susceptible of embodiments in many different forms, there is shown in the drawings, and will herein be described in detail, one or more embodiments of the invention with the understanding that the present disclosure is to be considered as an exemplification of the principles of the invention and is not intended to limit the broad aspect of the invention to embodiments illustrated.

The present application discloses a device that automatically actuates the reversing lever of a ratchet mechanism when the circumferential direction of a motor driveshaft operably coupled to the ratchet mechanism is changed. The auto-shift mechanism includes a worm gear that rotates with the driveshaft, and a disc mounted on the worm gear that laterally moves with rotation of the worm gear. The disc can include an arm that actuates a reversing mechanism by either pulling or pushing the reversing lever. In an embodiment, a lost-motion mechanism is also provided so torque from the motor can initially be applied to the auto-shift mechanism, rather than a drive head of the tool, when the motor changes circumferential direction.

Referring to FIG. 1, a tool 100 according to the present application is shown. In an embodiment, the tool 100 can be a powered ratchet tool, such as a battery-powered socket wrench or screwdriver. Alternately, the tool 100 can be any other form of hand or powered tool that includes a ratchet mechanism. The tool 100 can include a pawl mechanism 101 cooperatively engageable with a ratchet gear 102 to permit rotation of the ratchet gear in a first drive direction, and to substantially impair rotation of the ratchet gear in a second direction opposite the first drive direction.

Figure 2:
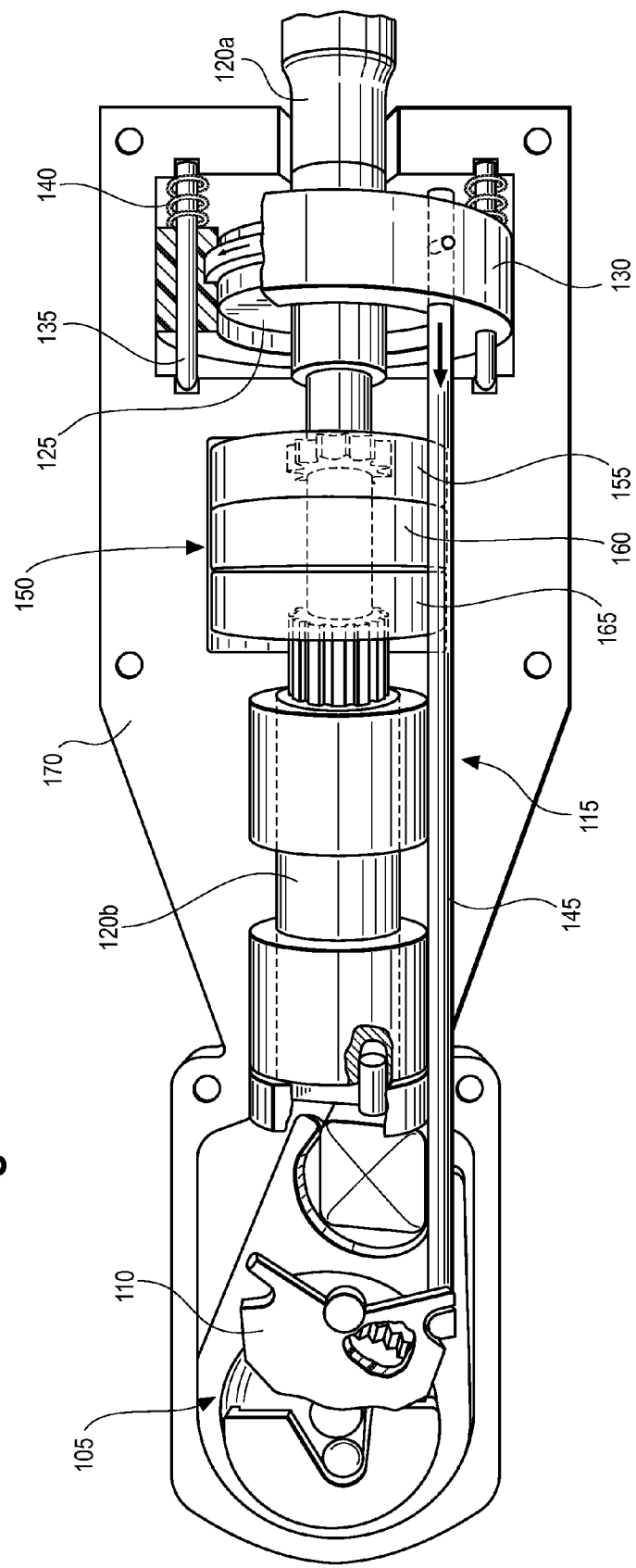
FIG. 2 is a cross-sectional view of an auto-shift mechanism actuated in the forward direction according to an embodiment of the present application.
Figure 3:
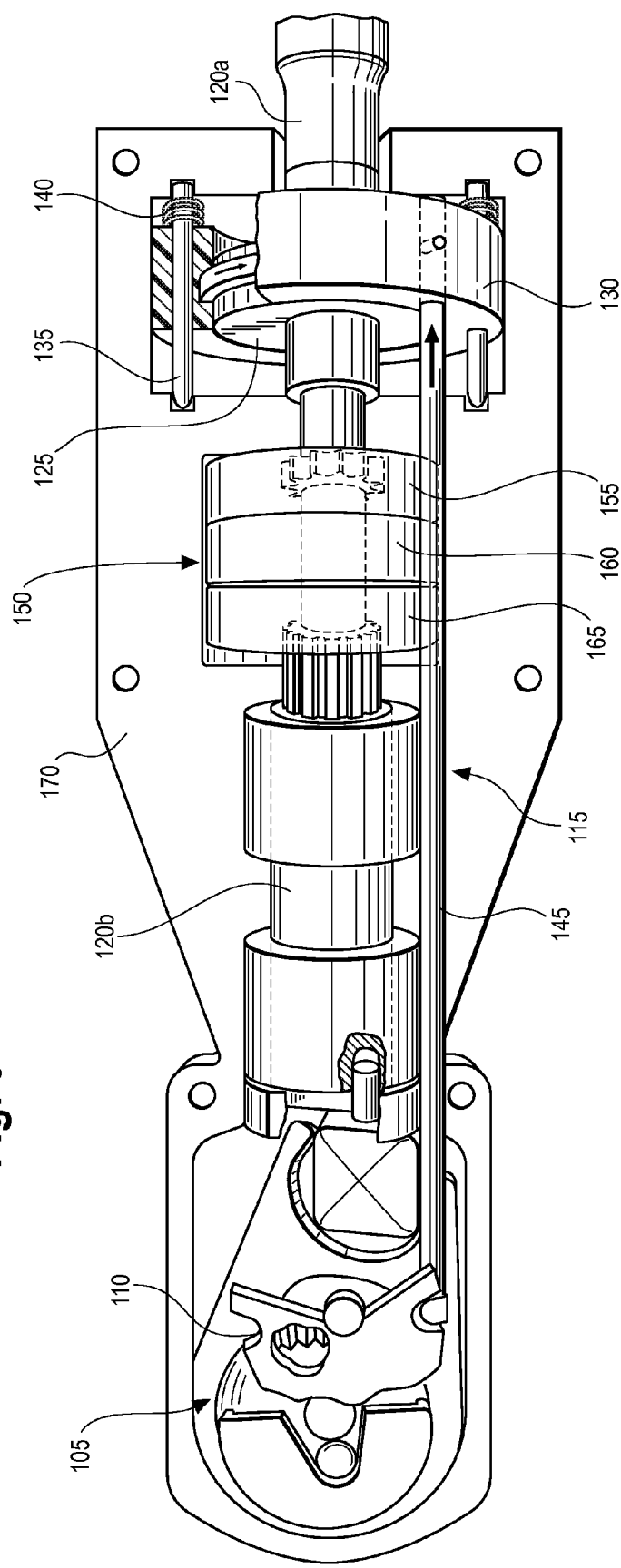
FIG. 3 is a cross-sectional view of an auto-shift mechanism actuated in the reverse direction according to an embodiment of the present application.
Figure 4:
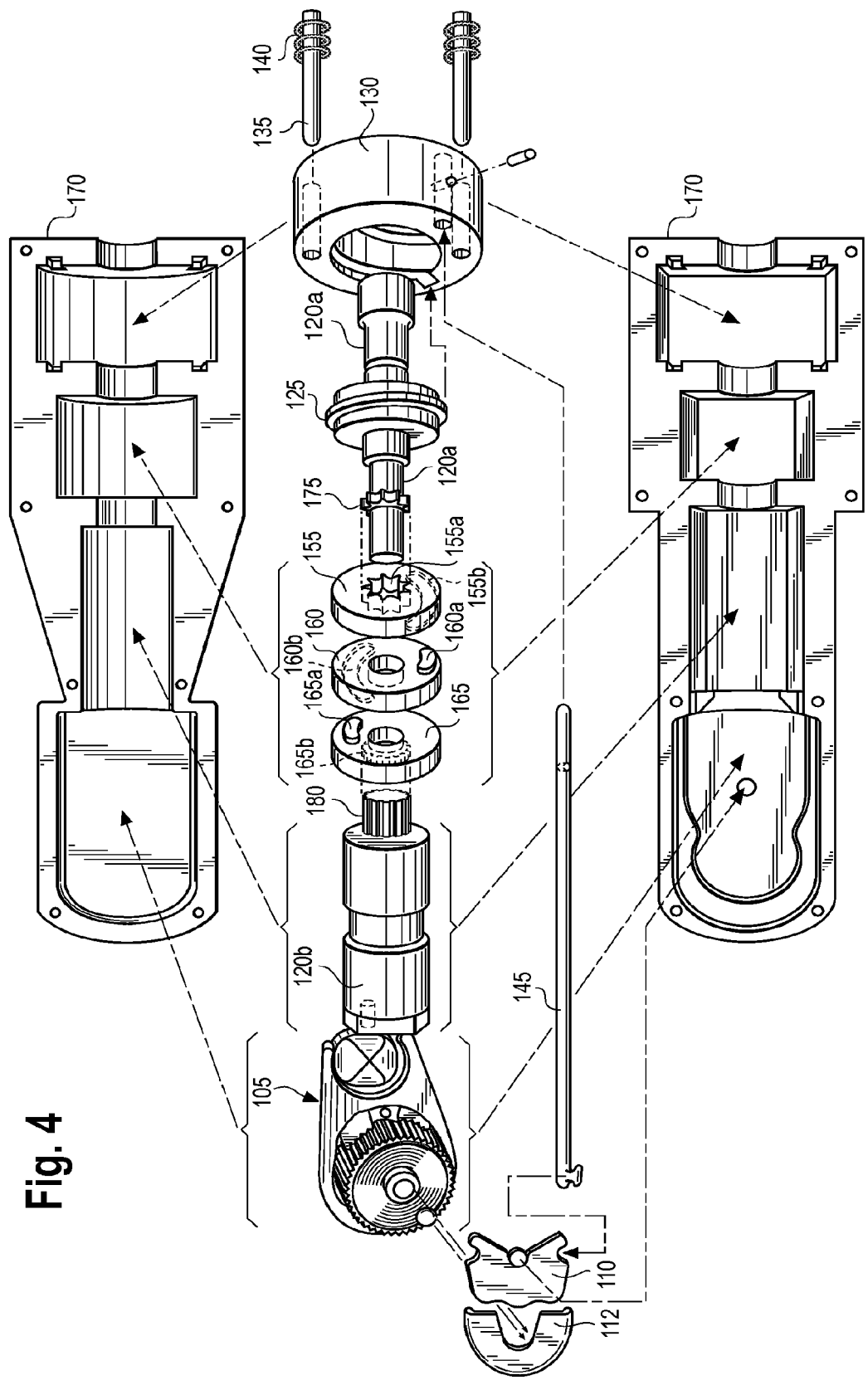
FIG. 4 is an exploded view of the auto-shift mechanism according to an embodiment of the present application.

Referring now to FIGS. 2 and 3, some of the internal components of the tool 100 according to an embodiment of the present application is shown. FIG. 2 illustrates the tool 100 actuated in a first drive direction, and FIG. 3 illustrates the tool 100 actuated in a second drive direction opposite the first ratchet direction. FIG. 4 illustrates an exploded view of the internal components shown in FIGS. 2 and 3.

As shown, the tool 100 can include a ratchet head 105 having a reversing lever 110 and switching member 112 coupled to the ratchet head 105 for controlling the drive direction of the tool 100. The reversing lever 110 and switching member 112 are manipulated by an auto-shift mechanism 115 that switches the reversing lever 110 when the motor of the tool 100 changes its circumferential direction. The reversing lever 110 can be operably coupled to the pawl mechanism 101 and adapted to control the drive direction of the ratchet gear 102. The auto-shift mechanism 115 can include a first driveshaft 120a and a second driveshaft 120b that collectively transmit torque from the motor to the ratchet head 105. Both the first driveshaft 120a and the second driveshaft 120b can extend in an axial direction and rotate in a circumferential direction. The first driveshaft 120a can include a worm gear 125 upon which a disc 130 axially shifts when the first driveshaft 120a rotates. For example, the disc 130 can move axially along rails 135 that are biased by springs 140 in the direction of the ratchet head 105.

To facilitate axial movement of the disc 130, the disc 130 can include internal threads that cooperatively engage external threads of the worm gear 125. In an embodiment, the worm gear 125 is substantially fixed in the axial direction, but movable in the circumferential direction, and the disc 130 is substantially fixed in the circumferential direction, but movable in the axial direction along the rails 135. Also, springs 140 are adapted to provide an axial bias against the disc 130 to assist the threads of the worm gear 125 engage the threads of the disc 130 when the disc 130 moves axially along the worm gear 125. Accordingly, when the worm gear 125 rotates, the threads of the worm gear 125 cooperatively engage the threads of the disc 130 and cause the disc 130 to move axially along the worm gear 125. An arm 145 can be coupled to the disc 130 and the reversing lever 110 to transfer axial movement of the disc 130 to the reversing lever 110 to change the drive direction of the tool 100 when the motor direction changes.

In an embodiment, the circumferential direction of the motor can be translated into an axial movement of the disc 130 by worm gear 125, and the disc 130 can shift axially to either pull or push the arm 145 against the reversing lever 110 to automatically shift the drive direction of the reversing lever 110 when the motor direction changes. Accordingly, a user need not manually actuate the reversing lever 110 during operation of the tool 100. Rather, the user can allow the auto-shift mechanism 115 to communicate the changed circumferential direction of the motor to the reversing lever 110 to automatically shift the reversing lever 110 to the intended drive direction.

In an embodiment, the tool 100 can include a lost motion mechanism 150 that, when the motor circumferential direction changes, absorbs the initial application of torque rather than transferring this torque to the ratchet head 105. Without the lost motion mechanism 150, the ratchet head 105 would first be rotated in the wrong drive direction until the auto-shift mechanism 115 actuates the reversing lever 110 to shift it into the intended drive direction. The lost motion mechanism 150 therefore allows the auto-shift mechanism 115 to run its course and shift the reversing lever 110 to the intended drive direction prior to a substantial amount of torque being applied to the ratchet head 105.

As shown in FIG. 4, torque is transmitted from the first driveshaft 120a to the second driveshaft 120b via the lost motion mechanism 150. In an embodiment, the lost motion mechanism 150 includes a first gear 155, a second gear 160, and a third gear 165, each disposed within a base 170. The first gear 155 can include an opening 155a and a slot 155b, the second gear 160 can include a rib 160a and a slot 160b, and the third gear 165 can include a rib 165a and a receiving portion 165b. The rib 160a of the second gear 160 can rotate within the slot 155b of the first gear 155, and the rib 165a of the third gear 165 can rotate within the slot 160b of the second gear 160. Of course, the rib and slot relationship discussed above can be reversed without departing from the spirit and scope of the present application. For example, the first gear 155 can include a rib, and the second gear 160 can include a corresponding slot that the rib of the first gear 155 can rotate within to transfer the torque from the first gear 155 to the second gear 160.

The first gear 155 can be coupled to one end of the first driveshaft 120a and receive torque from the motor via the first driveshaft 120a. As shown, the first driveshaft 120a can include a receiving gear 175 that matingly couples with a correspondingly-shaped opening 155a of the first gear 155 to supply torque to the lost motion mechanism 150. In an embodiment, the first gear 155 will not transfer the torque to the second gear 160 until the slot 155a of the first gear reaches the rib 160b of the second gear 160. Similarly, the second gear 160 will not transfer the torque to the third gear 165 until the slot 160b of the second gear 160 reaches the rib 165a of the third gear 165. The third gear 165 can then transfer torque to the second driveshaft 120b by engaging the receiving portion 165b against a knob 180 of the second driveshaft 120b.

In an embodiment, the lost motion mechanism 150 effectively delays any substantial application of torque transmission from the motor to the ratchet head 105 so that the auto-shift mechanism 115 can run its course and actuate the reversing lever 110 when the motor circumferential direction changes. The auto-shift mechanism 115 is powered by torque from the motor, so the lost motion mechanism 150 can absorb any torque that would be applied to the ratchet head 105 while the auto-shift mechanism 115 actuates the reversing lever 110. The lost motion mechanism 150 therefore ensures that the motor torque is applied to the auto-shift mechanism 115 rather than the ratchet head 105 while the reversing lever 110 is actuated.

As discussed above, the tool 100 can include a motor that provides torque to the various components of the tool 100 and, ultimately, a fastener or work piece, such as, for example, a bolt or screw. The embodiments described herein may include or be utilized with any appropriate voltage or current source, such as a battery, an alternator, a fuel cell, and the like, providing any appropriate current and/or voltage, such as about 12 Volts, about 42 Volts, and the like. The embodiments described herein may also be used with any desired system or engine. Those systems or engines may comprise items utilizing fossil fuels, such as gasoline, natural gas, propane and the like, electricity, such as that generated by a battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like. While useful in some embodiments, a motor is not an essential component of the present invention.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A tool adapted to apply a torque to a work piece comprising:
   a ratchet gear adapted to transmit the torque to the work piece in either of a first or second rotational drive direction, wherein the first rotational drive direction is opposite the second rotational drive direction;
   a pawl mechanism adapted to engage the ratchet gear to selectively permit rotation of the ratchet gear in the first rotational drive direction and substantially prevent rotation of the ratchet gear in the second rotational drive direction, and selectively permit rotation of the ratchet gear in the second rotational drive direction and substantially prevent rotation of the ratchet gear in the first rotational drive direction;
   a reversing lever operably coupled to the pawl mechanism and adapted to selectively choose either of the first and second rotational drive directions for the ratchet gear; and
   an auto-shift mechanism including:
      a rotatable first driveshaft extending in an axial direction;
      a worm gear coupled to the first driveshaft and having gear threads;
      a disc having disc threads cooperatively engageable with the gear threads; and
      an arm coupled to the disc and the reversing lever,
   wherein the disc is axially movable along the first driveshaft to shift the reversing lever upon rotation of the worm gear.

2. The tool of claim 1, further comprising a rail along which the disc moves axially upon rotation of the worm gear.

3. The tool of claim 2, further comprising a spring abutting the disc and adapted to bias the disc in the axial direction.

4. The tool of claim 1, further comprising a lost motion mechanism including:
   a first gear coupled to the first driveshaft and adapted to receive the torque from the first driveshaft;
   a second gear coupled to the first gear and adapted to receive the torque from the first gear after the first gear rotates a first predetermined angle;
   a third gear coupled to the second gear and adapted to receive the torque from the second gear after the second gear rotates a second predetermined angle; and
   a second driveshaft coupled to the third gear and adapted to receive the torque from the third gear.

5. The tool of claim 4, wherein one of the first and second gears includes a gear slot, and the other of the first and second gears includes a gear rib adapted to rotate within the gear slot.

6. The tool of claim 4, wherein the first driveshaft includes a receiving gear and the first gear includes a first gear opening adapted to receive the receiving gear.

7. The tool of claim 1, wherein the disc is substantially non-rotatably disposed relative to the first driveshaft.

8. The tool of claim 1, wherein the first driveshaft is substantially non-rotatably disposed relative to the disc.

9. An auto-shift reversing mechanism adapted to control a drive direction of a ratchet, the auto-shift reversing mechanism comprising:
   a rotatable first driveshaft extending in an axial direction;
   a worm gear coupled to the first driveshaft and having gear threads;
   a disc having disc threads cooperatively engageable with the gear threads and adapted to axially move along the first driveshaft upon rotation of the worm gear; and
   an arm coupled to the disc and a reversing lever of the ratchet.

10. The auto-shift reversing mechanism of claim 9, further comprising a rail along which the disc moves axially upon rotation of the worm gear.

11. The auto-shift reversing mechanism of claim 10, further comprising a spring abutting the disc and adapted to bias the disc in the axial direction.

12. The auto-shift reversing mechanism of claim 9, further comprising a lost motion mechanism including:
   a first gear coupled to the first driveshaft and adapted to receive a torque from the first driveshaft;
   a second gear coupled to the first gear and adapted to receive the torque from the first gear after the first gear rotates a first predetermined angle;
   a third gear coupled to the second gear and adapted to receive the torque from the second gear after the second gear rotates a second predetermined angle; and
   a second driveshaft coupled to the third gear and adapted to receive the torque from the third gear.

13. The auto-shift reversing mechanism of claim 12, wherein one of the first and second gears includes a gear slot, and the other of the first and second gears includes a gear rib adapted to rotate within the gear slot.

14. The auto-shift reversing mechanism of claim 12, wherein the first driveshaft includes a receiving gear and the first gear includes a first gear opening adapted to receive the receiving gear.

15. The auto-shift reversing mechanism of claim 9, wherein the disc is substantially non-rotatably disposed relative to the first driveshaft.

16. The auto-shift reversing mechanism of claim 9, wherein the first driveshaft is substantially non-rotatably disposed relative to the disc.

\* \* \* \* \*